United States Patent
La Rosa et al.

(10) Patent No.: US 12,205,650 B2
(45) Date of Patent: Jan. 21, 2025

(54) PROTECTION OF AN INTEGRATED CIRCUIT

(71) Applicants: STMicroelectronics International N.V., Geneva (CH); STMicroelectronics (Rousset) SAS, Rousset (FR)

(72) Inventors: Francesco La Rosa, Rousset (FR); Marco Bildgen, Habere-Poche (FR)

(73) Assignees: STMICROELECTRONICS (ROUSSET) SAS, Rousset (FR); STMICROELECTRONICS INTERNATIONAL N V, Geneva (CH)

( * ) Notice: Subject to any disclaimer, the term of this patent is extended or adjusted under 35 U.S.C. 154(b) by 190 days.

(21) Appl. No.: 18/173,472

(22) Filed: Feb. 23, 2023

(65) Prior Publication Data

US 2023/0282286 A1    Sep. 7, 2023

(30) Foreign Application Priority Data

Mar. 7, 2022    (FR) ...................................... 2201938

(51) Int. Cl.

| | |
|---|---|
| *G11C 16/22* | (2006.01) |
| *G06F 21/78* | (2013.01) |
| *G11C 16/16* | (2006.01) |
| *H10B 41/30* | (2023.01) |

(52) U.S. Cl.
CPC ............. *G11C 16/22* (2013.01); *G06F 21/78* (2013.01); *G11C 16/16* (2013.01); *H10B 41/30* (2023.02)

(58) Field of Classification Search
CPC .......... G11C 16/22; G11C 16/16; G11C 7/24; G06F 21/78; G06F 21/72; G06F 21/79; G06F 2221/034; G06F 2221/2143; H10B 41/30

See application file for complete search history.

(56) References Cited

U.S. PATENT DOCUMENTS

| | | |
|---|---|---|
| 7,398,554 B1 | 7/2008 | Falik et al. |
| 2013/0228846 A1 | 9/2013 | La Rosa et al. |
| 2014/0082257 A1* | 3/2014 | Scouller ............. G06F 12/1466 711/E12.008 |
| 2018/0322278 A1* | 11/2018 | Hershman ........... G06F 11/1004 |

FOREIGN PATENT DOCUMENTS

| | | |
|---|---|---|
| FR | 3036221 A1 | 11/2016 |
| FR | 3049380 A1 | 9/2017 |
| WO | 2018125325 A1 | 7/2018 |

* cited by examiner

*Primary Examiner* — Sultana Begum
(74) *Attorney, Agent, or Firm* — Slater Matsil, LLP

(57) ABSTRACT

An integrated circuit comprises a memory device including a memory plane having non-volatile memory cells and being non-observable in read mode from outside the memory device, a controller, internal to the memory device, configured to detect the memorized content of the memory plane, and when the memorized content contains locking content, automatically lock any access to the memory plane from outside the memory device, the integrated circuit then being in a locked status, and authorize delivery outside the memory device of at least one sensitive datum stored in the memory plane.

34 Claims, 12 Drawing Sheets

PROTECTION OF AN INTEGRATED CIRCUIT

CROSS-REFERENCE TO RELATED APPLICATIONS

This application claims the benefit of French Patent Application No. 2201938, filed on Mar. 7, 2022, which application is hereby incorporated herein by reference.

TECHNICAL FIELD

Implementations and embodiments relate to integrated circuits, and more particularly to the protection of integrated circuits containing sensitive data.

BACKGROUND

When an integrated circuit comes out of manufacture, and it is intended to store at least one sensitive datum contributing to ensure the functionality of a functional area of the integrated circuit, for example an encryption key or basic datum involved in the generation of an encryption key, there is a need to protect the integrated circuit, in particular before its delivery to a user or else after its delivery, against attempts to extract this sensitive datum by a malicious third party.

A known solution from the prior art consists in locking access to the sensitive datum stored in the integrated circuit by using fuses intended to be opened to perform this access locking. However, such opened fuses can be reactivated using techniques called FIB (Focused Ion Beam) techniques to change the state of certain components of the integrated circuit.

There is therefore a need to protect such an integrated circuit more effectively.

SUMMARY

According to one implementation and embodiment, it is proposed to identify an integrated circuit coming out of manufacture and, after having stored at least one sensitive datum therein, to lock it with an irreversible mechanism before introducing this product on the market, that is to say delivery to an end user.

According to one implementation and embodiment, a locking system is proposed, any unlock attempt of which leads to the destruction of at least part of the sensitive datum.

According to one implementation and embodiment, provision is made to equip the integrated circuit with a memory device including a memory plane including non-volatile memory cells of the floating-gate type. The memory plane is subdivided into several memory areas, including a memory area intended to store the sensitive datum, and one or more other memory areas are intended to define the status of the integrated circuit.

Thus, if the memory plane includes a first content or reference pattern, the integrated circuit is considered to have a status called "unlocked" status and it is then possible, for example, at the end of manufacture, to carry out a series of tests of the memory plane.

It is then possible in particular to store therein a second content or reference pattern corresponding to a status called "locked" status of the integrated circuit. This second reference content or pattern then forms a locking content or pattern. And, in this case, the sensitive datum is stored in the corresponding memory area of the memory plane and the write access to the memory device is locked. Then, it becomes possible for the memory device to output the sensitive datum.

The memory device can be write-only accessible (programming or erasing), that is to say it is totally unobservable from the outside. In other words, it is not possible for an external user to read the content of the memory plane.

On the other hand, a dedicated logic, internal to the memory device, can scan the memory plane to detect the memorized content, and in the case where the second reference content is detected, lock write access to the memory plane and authorize the delivery of the sensitive datum outside the memory device.

Thus, according to one aspect, an integrated circuit is proposed, comprising a memory device including a memory plane having non-volatile memory cells and being non-observable in read mode from outside the memory device, a controller, internal to the memory device, configured to detect the memorized content of the memory plane, and when the memorized content contains locking content, lock, advantageously automatically and advantageously irreversibly, any access to the memory plane from outside the memory device, the integrated circuit then being in a locked status, and authorize delivery outside the memory device of at least one datum called sensitive datum stored in the memory plane.

When the integrated circuit comprises at least one functional domain, for example a domain including encryption/decryption, the at least one sensitive datum advantageously contributes to ensuring the functionality of the functional domain.

According to one embodiment, the memory plane is write-only accessible from outside the memory device and comprises an interface configured to receive data to be written in the memory plane.

The memory device also comprises an access block, for example, a programming and/or erasing block, configured, when the memory plane contains a particular content corresponding to a status called "unlocked" status of the integrated circuit, to store in the memory plane via the interface, the locking content or pattern corresponding to the "locked" status of the integrated circuit and the at least one sensitive datum.

The controller, internal to the memory device, is configured, when the memorized content contains the locking content, advantageously to irreversibly prohibit any access to the memory plane via the interface and authorize delivery of the sensitive datum outside the memory device.

According to one embodiment, the respective mappings of the particular content and of the locking content, the location of the at least one sensitive datum in the memory plane as well as the structural features of the memory plane are such that when the integrated circuit is in its locked status, an attempt to modify the content memorized in the memory plane, for example an attempt to program certain erased memory cells and/or an attempt to return to the particular content, place the integrated circuit in a status called "invalid" status prohibiting the delivery of the at least one sensitive datum outside the memory device and/or destroy at least a part of the at least one memorized sensitive datum, that is to say change the logic value of one or more bits of this sensitive datum.

More particularly, since the memory cells are generally joined together, the surface size of each memory cell is less than a limit size, for example 0.1 square micron.

For example, the size of a memory cell can be equal to 0.04 square microns.

Thus, even if a malicious third party tries to change the state of a memory cell by using ultraviolet radiation while trying to mask other adjacent memory cells the state of which is not to be changed, for example by masking using a drop of ink, the size of the memory cells will nevertheless lead to the change of the state of the masked cells, in particular by diffraction of ultraviolet radiation.

Similarly, the size of these memory cells will make it extremely difficult, if not impossible, to change their state by an FIB technique.

The controller is advantageously configured to detect the content memorized in the memory plane and signal an anomaly if the memorized content is different from the particular content or from the locking content.

The signaling of this anomaly can for example result in a blocking of the integrated circuit, since the status of the integrated circuit would then be a status called "invalid" status.

The particular content may include a first reference content which is for example at least part of the content of the memory plane obtained after the manufacture of the integrated circuit.

As will be seen in more detail below, this first reference content can be characterized by a certain number of memory cells of an area of the memory plane in the erased state.

That being the case, if before memorizing the locking content in the memory plane, it is desired to perform one or more tests of this memory plane with one or more test patterns, it is then advantageous, according to one embodiment, that the pattern(s) are also representative of the unlocked status. Indeed, if this is not the case, the writing of such a test pattern in the memory plane would lead to an invalid status which could block the integrated circuit.

In other words, according to a particularly advantageous embodiment, and with the objective of carrying out test(s) of the memory plane, the particular content belongs to the group formed by the first reference content and by at least one first test content intended to be used to test the memory plane before memorizing the locking content.

For example, a first particularly interesting test content may include logic "0" and logic "1" together forming a checkerboard.

A second test content, also of particular interest, may include a checkerboard reversed with respect to the checkerboard of the first test content.

According to one embodiment, each memory cell is configured to have a first state corresponding to a first logic of a bit stored in this memory cell.

This first state can thus correspond to the erased state of the memory cell, the bit stored in this memory cell in the erased state then having for example the logic value 1.

Each memory cell is also configured to have a second state corresponding to a second logic value of the bit stored in this memory cell.

Thus, for example, the second state corresponds to the programmed state of the memory cell, the bit stored in this memory cell in the programmed state then having the logic value 0.

The at least one sensitive datum includes at least one bit, but generally several bits, for example 64 or 128 bits.

The memory plane includes for example a first area containing one or more first memory cells configured to respectively store the bit(s) of the at least one sensitive datum.

The memory plane also includes, for example, a second area and a third area.

According to one embodiment, in the locked status, the first area contains the at least one sensitive datum while the memory cells of the second area are in their first state, for example the erased state, and the memory cells of the third area are in their second state, for example the programmed state, the logic values of the bits of the memory cells of the second area and of the third area forming the locking content.

The fact that the memory cells of the second area are in the erased state, advantageously storing a bit with a logic value "1", is particularly interesting because this allows to thwart attacks aiming at blocking a bus or a read amplifier with logic values "0".

According to one embodiment, in the unlocked status, the at least one sensitive datum is not stored in the first area and the third area includes a number, greater than a threshold, of memory cells in their first state, for example the erased state, the logic values of these memory cells in their first state forming the first reference content.

This threshold can be equal to 90% of the number of memory cells of the third area.

Indeed, at the output of the manufacture, the memory cells of the memory plane are in their virgin state, that is to say that they are generally in an erased state but some of them may nevertheless be in a state corresponding to a programmed state.

The number of first memory cells (that is to say the memory cells of the first area intended to contain the bit(s) of the sensitive datum) is advantageously lower than the number of memory cells of the third area and these first memory cells are dispersed within the memory plane.

By way of indication, the number of first memory cells may be less than 15%, for example equal to 10%, of the number of memory cells of the memory plane.

Similarly, the number of second memory cells, that is to say the memory cells of the second area, is advantageously lower than the number of memory cells of the third area and the second memory cells are also dispersed within the memory plane.

The number of second memory cells is advantageously also less than 15%, for example equal to 10%, of the number of memory cells of the memory plane.

Thus, for example, 80% of the memory cells of the memory plane are memory cells of the third area, 10% of these memory cells are first memory cells and 10% of these memory cells are memory cells of the second area.

According to one embodiment, in order to memorize the locking content and the at least one sensitive datum, the access block is configured to
  place all the memory cells of the memory plane in their first state (for example the erased state), then
  store the at least one sensitive datum in the first memory cell(s), then
  place all the memory cells of the third area in their second state (the programmed state).

The memory cells of the second area, which have been erased beforehand, remain in their erased state.

According to one embodiment, the controller includes
  a locking block configured, in the presence of a control signal, to lock access to the write memory plane, and
  a control block configured to detect the content memorized in the memory plane and, when the locking content is detected, to deliver the control signal to the locking block and deliver the at least one sensitive datum outside the memory device.

The integrated circuit also advantageously further comprises a temporary memory configured to store the at least one sensitive datum when the integrated circuit is in its unlocked status, and the access block is configured to copy the at least one sensitive datum into the first memory cells and to erase the temporary memory, when switching from the unlocked status to the locked status.

The control block is also advantageously configured to signal the anomaly if the memorized content is different from the particular content or from the locking content.

The memory cells are advantageously memory cells each having a floating gate, a control gate and a selection transistor buried in a substrate.

The integrated circuit can form a microcontroller.

According to another aspect, provision is made of a method for protecting an integrated circuit, comprising:

equipping the integrated circuit with a memory device including a memory plane having non-volatile memory cells and being non-observable in read mode from outside the memory device, causing the memory device itself to detect the memorized content of the memory plane, and when the memorized content contains locking content, having the memory device itself lock, advantageously automatically, any access to the memory plane from outside the memory device, the integrated circuit then being in a locked status, and having the memory device itself authorize delivery outside the memory device of at least one datum called sensitive datum stored in the memory plane.

This locking is advantageously irreversible and is carried out after the manufacture of the integrated circuit and before delivery of the integrated circuit to a user.

The at least one sensitive datum is advantageously memorized in the memory plane when the memory plane contains a particular content, corresponding to a status called "unlocked" status of the integrated circuit, and obtained for example from memory cells in the virgin state resulting from the manufacture of the integrated circuit. This sensitive datum is memorized in the memory plane before its locking triggered by the storage of the locking content.

According to an embodiment wherein the memory device including an interface, step b) further comprises, when the memory plane contains a particular content corresponding to a status called unlocked status of the integrated circuit, memorizing in the memory plane via the interface, the locking content and the at least one sensitive datum, and step c) comprises having the memory device prohibit any access to the memory plane via the interface and having the memory device itself authorize the delivery of the at least one sensitive datum outside the memory device.

According to one implementation, step a) is carried out during the manufacture of the integrated circuit, and the steps b) and c) are carried out after the manufacture of the integrated circuit and before delivery of the integrated circuit to a user.

According to one implementation, the method comprises, after delivery of the integrated circuit to the user, during the operation of the integrated circuit, before any operation carried out by the integrated circuit requiring at least one use of the at least one sensitive datum, a detection by the memory device of the memorized content of the memory plane, and if the memorized content contains the locking content, a delivery by the memory device of the at least one sensitive datum outside the memory device.

According to one implementation, when the integrated circuit is in its locked status, an attempt to modify the content memorized in the memory plane places the circuit in a status called invalid status prohibiting the delivery of the at least one sensitive datum outside the memory device and/or destroys at least a part of the at least one memorized sensitive datum.

According to one embodiment, the memory device signals an anomaly if the memorized content is different from the particular content or from the locking content.

According to one implementation, the particular content includes a first reference content which is at least part of the content of the memory plane obtained at the end of the manufacture of the integrated circuit.

The particular content can also belong to the group formed by the first reference content and at least one first test content, and step b) further comprises a memory plane test with the at least one first test content.

According to one implementation, in the unlocked status, the at least one sensitive datum is stored in a separate temporary memory of the memory plane, and the memorization of the locking content comprises erasing all the memory cells of the memory plane, then storing the at least one sensitive datum in the memory plane and writing the locking content in the memory plane and erasing the temporary memory.

According to one implementation, the surface size of each memory cell is less than a limit size.

According to one implementation, each memory cell is configured to have a first state corresponding to a first logic value of a bit stored in this memory cell and a second state corresponding to a second logic value of the bit stored in this memory cell.

The at least one sensitive datum includes at least one bit and the memory plane includes a first area containing one or more first memory cells configured to respectively store the bit(s) of the at least one sensitive datum, a second area and a third area.

In the locked status, the at least one sensitive datum is stored in the first memory cell(s), the memory cells of the second area are placed in their first state and the memory cells of the third area are placed in their second state, the logic values of the bits of the memory cells of the second area and of the third area forming the locking content.

According to one implementation, the first state corresponds to the erased state of the memory cell, the bit stored in this memory cell in the erased state having the logic value 1, and the second state corresponds to the programmed state of the memory cell, the bit stored in this memory cell in the programmed state having the logic value 0.

According to one implementation, in the unlocked status, the at least one sensitive datum is not stored in the first area and the third area includes a number, greater than a threshold, of memory cells of the third area being in their first state, the logic values of these memory cells in their first state forming the first reference content.

According to one implementation, the threshold is equal to 90% of the number of memory cells of the third area.

According to one implementation, the number of first memory cells is less than the number of memory cells of the third area and the first memory cells are dispersed within the memory plane.

According to one implementation, the number of first memory cells is less than 15% of the number of memory cells of the memory plane.

According to one implementation, the number of memory cells of the second area is lower than the number of memory cells of the third area and the memory cells of the second area are dispersed within the memory plane.

According to one implementation, the number of memory cells of the second area is less than 15% of the number of memory cells of the memory plane.

According to one implementation, to memorize the locking content and the at least one sensitive datum, all the memory cells of the memory plane are placed in their first state, then the at least one sensitive datum is stored in the first memory cell(s), then all the memory cells of the third area are placed in their second state.

According to one implementation, the method further includes a storage of the at least one sensitive datum in a temporary memory when the integrated circuit is in its unlocked status, and when switching to the locked status, the at least one sensitive datum is copied into the first memory cell(s) and the temporary memory is erased.

BRIEF DESCRIPTION OF THE DRAWINGS

Other advantages and features of the invention will appear upon examining the detailed description of non-limiting implementations and embodiments and the appended drawings wherein.

DETAILED DESCRIPTION OF ILLUSTRATIVE EMBODIMENTS

Figure 1:
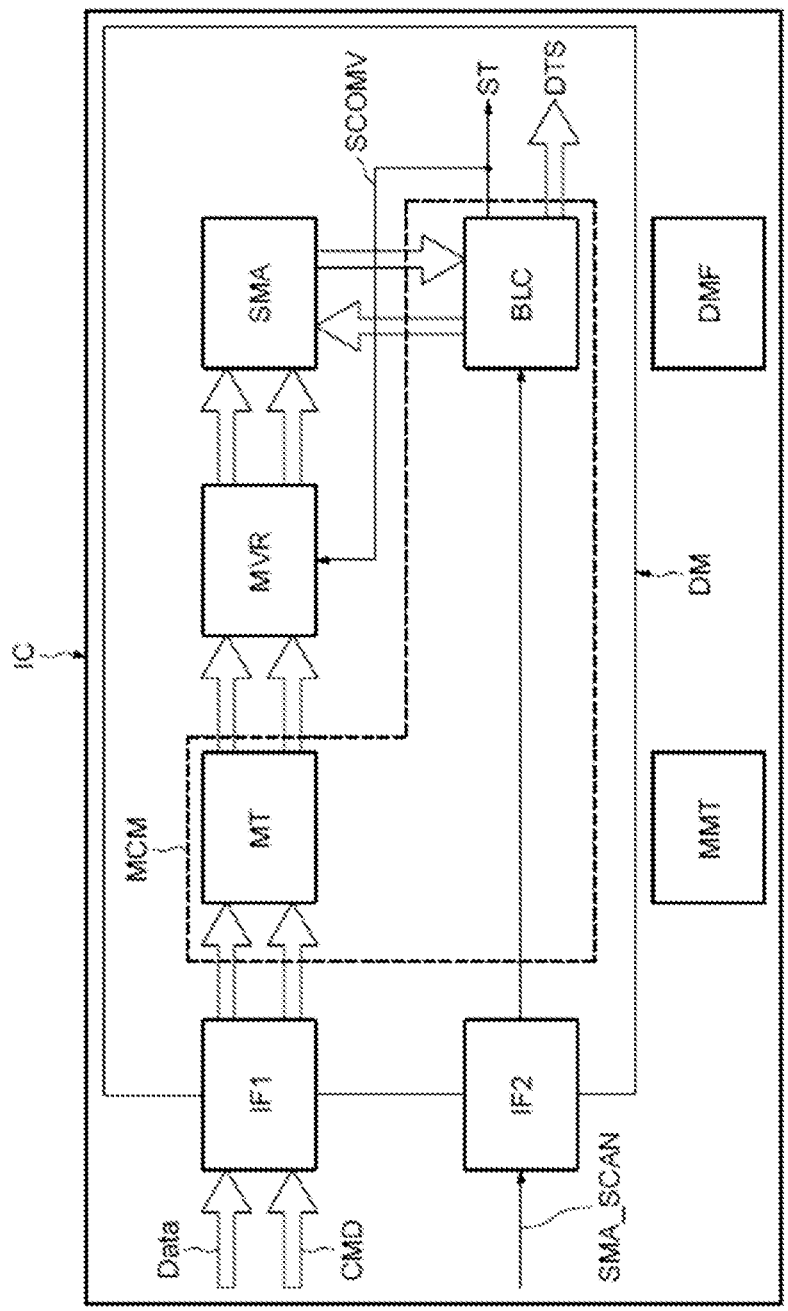
FIG. 1 illustrates an integrated circuit including a memory device having a secure memory plane.

In FIG. 1, the reference IC designates an integrated circuit, for example a microcontroller, comprising in particular a memory device DM having a memory plane SMA here forming a secure memory plane.

As will be seen in more detail below, the memory device DM is capable of having a status called unlocked status, for example at the output of the manufacture, wherein it is possible to carry out tests of the memory plane SMA and wherein a sensitive datum DTS, contributing to ensuring the functionality of a functional domain DMF of the integrated circuit, is stored in a temporary memory MMT.

The memory device is also intended to have a status called locked status, wherein the sensitive datum DTS is this time stored in the memory plane SMA.

The memory plane SMA is accessible from the outside, that is to say via an interface IF1, only in write mode.

The memory device is thus configured to receive in particular controls CMD, for example write and erase controls, as well as data Data to be written in the memory plane SMA.

The memory device therefore comprises access block MT of conventional and known structure, including in particular row decoders, column decoders, charge pumps, etc., and configured to carry out programming or erasing of the memory cells of the memory plane SMA, so as to write logic values 0 or 1 respectively.

On the other hand, the memory plane SMA is not observable, in read mode, from outside the memory device.

The memory device DM also includes controller MCM including on the one hand a control block BLC, the structure of which will be returned to in more detail below, and configured, in response to a scan control SMA_SCAN received via an additional interface IF2, to scan the memory plane SMA to detect the memorized content thereof.

The controller MCM also includes locking block MVR, configured, in response to a locking signal SCOMV emitted by the control block BLC, to lock the write access to the memory plane SMA.

By way of limiting example, locking block MVR can include switches, such as for example MOS transistors, disposed on the data bus and the control bus of the memory plane SMA. When these switches are closed, the write access is possible and when they are open, the write access is not possible.

Of course, other structures of the locking block are possible.

Moreover, even if in FIG. 1, the two interfaces IF1 and IF2 have been represented separately, they can of course be formed by a single and same interface.

The control block BLC also emits status information ST representing in particular the unlocked status or the locked status of the integrated circuit.

That said, as will be seen in more detail below, the status information ST can also be representative of a status called invalid status of the integrated circuit, when the latter is neither in its locked status nor in its unlocked status.

Figure 2:
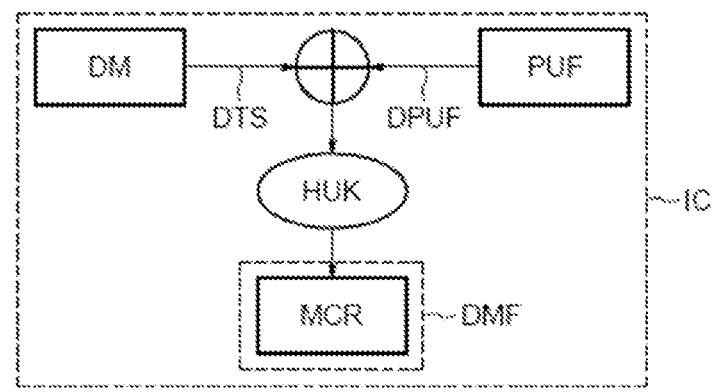
FIG. 2 illustrates a functional domain of the integrated circuit.

The functional domain DMF of the integrated circuit here can be, as illustrated very schematically in FIG. 2, a domain including encryption/decryption MCR, intended to receive an encryption key HUK resulting for example from a logic operation, for example an exclusive "OR", between the sensitive datum DTS delivered by the memory device, and a datum DPUF delivered by a physically unclonable function device PUF, of conventional structure and known per se.

And, this datum DTS, which is a sensitive datum, contributes to ensuring the functionality of the functional domain DMF, in particular of the encryption/decryption. Thus, if the sensitive datum DTS is corrupted or partially destroyed, the domain DMF is no longer functional.

Figure 3:
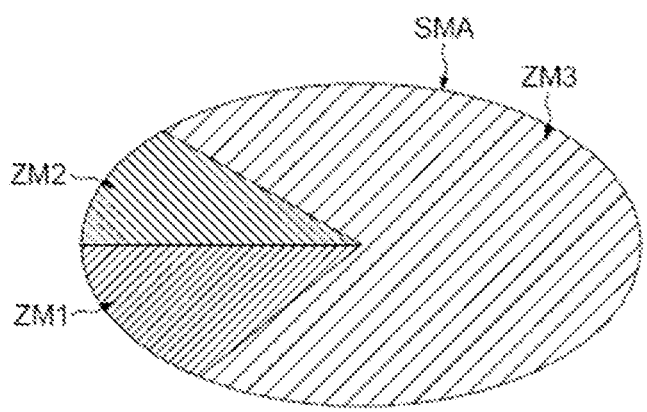
FIG. 3 illustrates a memory plane having three memory areas.

As illustrated in FIG. 3, the memory plane SMA here includes three memory areas ZM1, ZM2 and ZM3.

As will be seen below, the memory area ZM1 is intended to store in its memory cells, the bits of the sensitive datum DTS while, in this example, the memory cells of the areas ZM2 and ZM3 are intended to store a particular content (for example a first reference content which is part of the content of the memory plane obtained at the end of the manufacture of the integrated circuit) or a second reference content (also called locking content) respectively representative of the unlocked status and the locked status of the integrated circuit IC.

It is also possible, as will be seen below, for the entire memory plane to store, as particular content representative of the unlocked status, one or more test contents, for example a "checkerboard" or an "inverted checkerboard".

Figure 4:
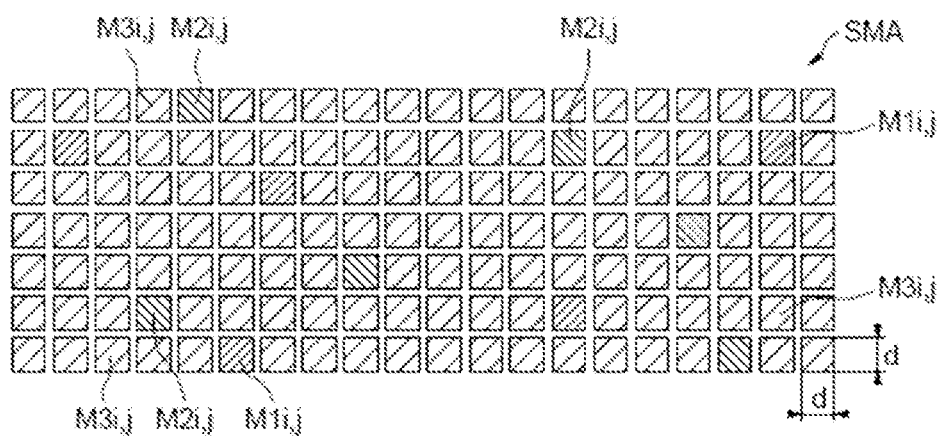
FIG. 4 illustrates a matrix of memory cells.

As illustrated very schematically in FIG. 4, the matrix of memory cells, arranged in rows and columns, of the memory plane SMA mainly includes memory cells M3$i,j$ of the third memory area ZM3 and a few cells M2$i,j$ of the second memory area ZM2.

The first memory area ZM1 includes as many memory cells M1$i,j$, called first memory cells, as there are bits in the sensitive datum DTS.

By way of non-limiting example, the matrix of memory cells includes 80% of memory cells M3$i,j$, 10% of memory cells M2$i,j$, and 10% of first memory cells M1$i,j$.

Moreover, as illustrated in FIG. 4, the memory cells M1$i,j$, and the memory cells M2$i,j$, are dispersed within the matrix of memory cells of the memory plane SMA.

Moreover, each memory cell substantially occupies a square location on the silicon, the side d of the square being for example here of the order of 0.2 micron leading to a surface size of the order of 0.04 square micron.

And, two adjacent memory cells are joined, even if in FIG. 4, they are represented spaced apart for the purpose of greater clarity of the figure.

The size of these memory cells, as well as the dispersion of the memory cells M2$i,j$ within the memory plane in particular, make it extremely difficult, if not impossible, for an attack by a malicious third party on the memory plane SMA using ultraviolet radiation, for example, with the purpose of selectively erasing certain memory cells without erasing the others.

Thus, if an attacker wants to erase a cell M3$i,j$ located next to a cell M1$i,j$ containing a bit of the sensitive datum, without wanting to erase the bit of this sensitive data, he could be tempted to mask this cell M1$i,j$, for example by masking using a drop of ink, so that the ultraviolet radiation does not impact this cell.

However, given the small size of the cells, ultraviolet radiation impacting the cell M3$i,j$ close to this cell M1$i,j$ masked by the drop of ink, will nevertheless erase the content of this cell M1$i,j$ by diffraction.

Likewise, it will be extremely difficult, if not impossible, for an attacker to carry out an attack using a FIB technique so as to selectively program certain memory cells without programming the adjacent memory cells.

The memory cells M1$i,j$ M2$i,j$ and M3$i,j$ are all here non-volatile cells of the split-gate type.

Figure 5:
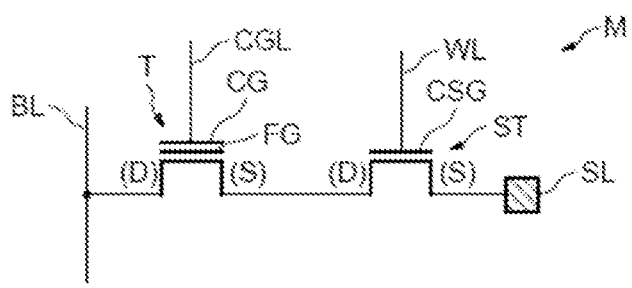
FIG. 5 illustrates split-gate type non-volatile memory cell.

In FIG. 5, the reference M denotes such a non-volatile memory cell of the split-gate type, for example of the selection transistor type having a vertical gate buried in the substrate of an integrated circuit.

More specifically, the memory cell M includes a state transistor T including a floating gate FG surmounted by a control gate CG connected to a gate control line CGL.

The drain (D) of the state transistor T is connected to a bit line BL while the source (S) of the state transistor T is connected to the drain of a selection transistor ST.

The selection transistor ST includes a gate CSG connected to a word line WL.

The source (S) of the selection transistor ST is connected to a source line SL.

With such memory cells, different memory plane structures are possible, namely a structure with a single bit line per column or a structure with two (or double) bit lines per column.

This being a structure with two bit lines per column, as for example described in the French patent application published under the no. 3049380 or in the French patent application published under the no. 3036221, is particularly advantageous because it simplifies in particular the reading of memory cells in the sense that it is not necessary to provide for the application of an inhibition voltage to a twin memory cell of the memory cell to be read.

Figure 6:
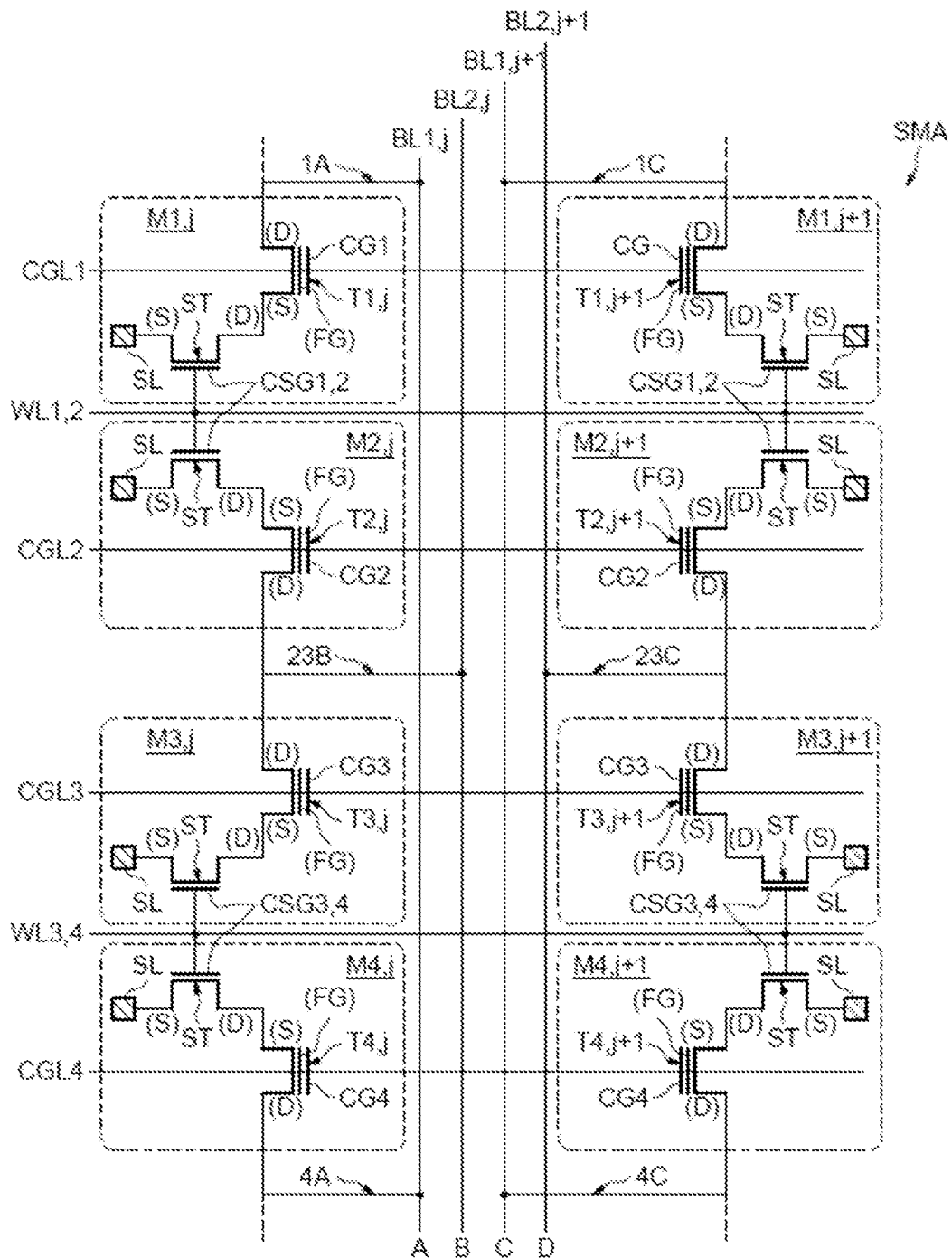
FIG. 6 illustrates an electrical diagram of an embodiment memory plane.

By way of example, FIG. 6 shows a memory plane SMA structure with two bit lines per column and comprising memory cells M$i,j$; M$i,j+1$; M$i-1,j$; M$i-1,j+1$ of the type described in patent application US 2013/0228846.

Figure 7:
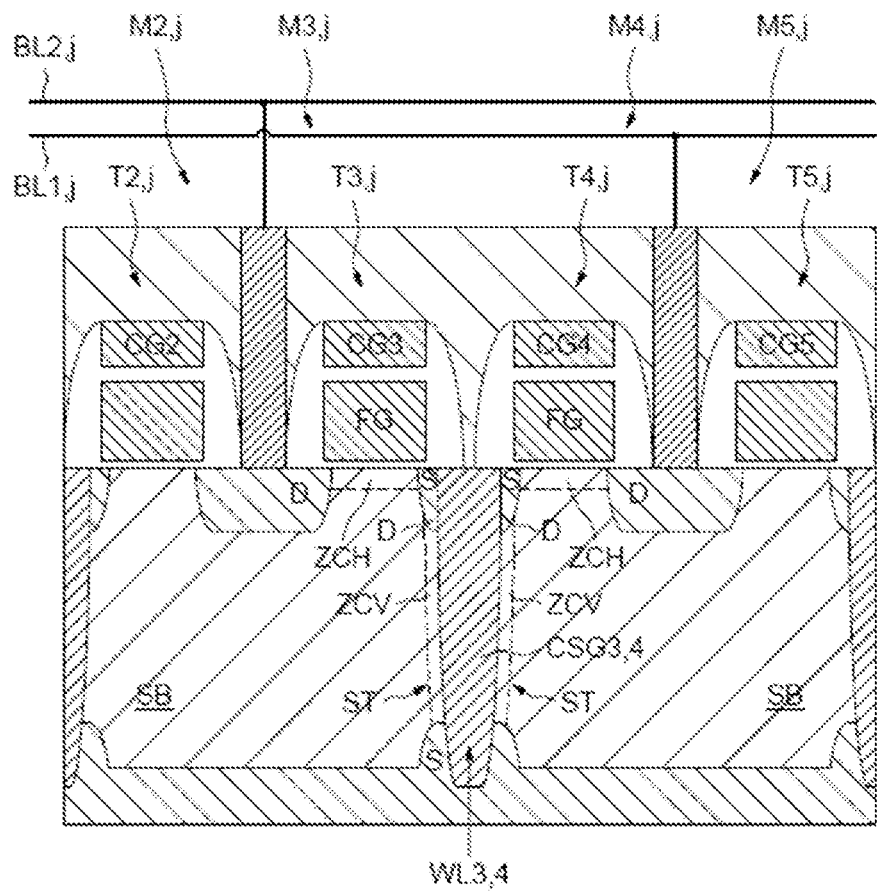
FIG. 7 illustrates a cross-section of the state and selection transistors of a memory cell.

For the purposes of simplification and clarity, the memory cells referenced in FIGS. 6 and 7 indiscriminately designate the memory cells M1$i,j$ or M2$i,j$ or M3$i,j$ located in the memory areas ZM1, ZM2 and ZM3 of the memory plane SMA shown in FIGS. 3 and 4.

FIG. 6 is the electrical diagram of one embodiment of such a memory plane SMA, produced in a semiconductor substrate. The memory plane comprises rows and columns of memory cells.

For the purposes of simplification and clarity, only eight memory cells M1,$j$, M2,$j$, M3,$j$, M4,$j$, M1,$j+1$, M2,$j+1$, M3,$j+1$, M4,$j+1$ belonging to the rows 1, 2, 3 and 4 and columns j and j+1 are shown here. Each memory cell includes a floating-gate state transistor (FG), respectively T1,$j$, T2,$j$, T3,$j$, T4,$j$, T1,$j+1$, T2,$j+1$, T3,$j+1$, T4,$j+1$, and a selection transistor ST whose drain terminal (D) is connected to the source terminal (S) of the floating-gate transistor.

The memory cells M1,$j$, M2,$j$, M3,$j$, M4,$j$ belong to a column of rank j and the memory cells M1,$j+1$, M2,$j+1$, M3,$j+1$, M4,$j+1$ belong to an adjacent column of rank j+1. The memory cells M1,$j$, M1,$j+1$ belong to a first row of memory cells and their floating-gate transistors T1,$j$, T1,$j+1$ have control gates CG1 connected to a control line of common gate CGL1. The memory cells M2,$j$, M2,$j+1$ belong to a second row of memory cells and their floating-gate transistors T2,$j$, T2,$j+1$ have control gates CG2 connected to a control line of common gate CGL2. The memory cells M3,$j$, M3,$j+1$ belong to a third row of memory cells and their floating-gate transistors T3,$j$, T3,$j+1$ have control gates CG3 connected to a control line of common gate CGL3. The memory cells M4,$j$, M4,$j+1$ belong to a fourth row of memory cells and their floating-gate transistors T4,$j$, T4,$j+1$ have control gates CG4 connected to a control line of common gate CGL4.

In the column of rank j, the memory cells M1,$j$, M2,$j$ are twin memory cells and their selection transistors ST include a common selection gate CSG1,2 connected to a common word line WL1,2.

Likewise, the memory cells M3,$j$, M4,$j$ are twin memory cells and their selection transistors ST include a common selection gate CSG3,4 connected to a common word line WL3,4.

In the column of rank j+1, the memory cells M1,$j+1$, M2,$j+1$ are twin memory cells and their selection transistors ST include a common selection gate CSG1,2 connected to the word line WL1,2.

The memory cells M3,$j+1$, M4,$j+1$ are twin memory cells and their selection transistors ST include a common selection gate CSG3,4 connected to the common word line WL3,4.

The common selection gates CSG1,2 or CSG3,4 of the pairs of twin memory cells are buried vertical gates made in the form of conductive trenches made in the substrate, and the source terminals (S) of the selection transistors ST are connected to a buried source plane SL, extending below the region of the substrate where the memory cells are implanted.

The memory plane SMA comprises two bit lines per column of memory cells. Thus, two bit lines BL1,j, BL2,j are allocated to the memory cells of the column of rank j, and two bit lines BL1,j+1, BL2,j+1 are allocated to the memory cells of the column of rank j+1.

Two twin memory cells are connected to different bit lines among the two bit lines assigned to the column wherein they are located, while two adjacent but non-twin memory cells are connected to the same bit line.

Thus, in the column of rank j:
the drain terminal (D) of the floating-gate transistor T1,j is connected to the bit line BL1,j via a conductive path 1A,
the drain terminal of the floating-gate transistor T2,j is connected to the bit line B2,j via a conductive path 23B,
the drain terminal of the floating-gate transistor T3,j is connected to the bit line BL2,j via the conductive path 23B (the memory cell M2,j being adjacent but not twin to the memory cell M3,j), and
the drain terminal of the floating-gate transistor T4,j is connected to the bit line BL1,j via a conductive path 4A.

In the column of rank j+1:
the drain terminal of the floating-gate transistor T1,j+1 is connected to the bit line BL1,j+1 via a conductive path 1C,
the drain terminal of the floating-gate transistor T2,j+1 is connected to the bit line BL2,j+1 via a conductive path 23D,
the drain terminal of the floating-gate transistor T3,j+1 is connected to the bit line BL2,j+1 via the conductive path 23D (the memory cell M2,j+1 being adjacent but not twin to the memory cell M3,j+1), and
the drain terminal of the floating-gate transistor T4,j+1 is connected to the bit line BL1,j+1 via a conductive path 4C.

As illustrated in FIG. 7, and as indicated above, each state transistor cooperates with a vertical selection transistor buried in the substrate SB.

The channel ZCH of the state transistor is referenced ZCH.

The selection transistors ST connected to the two state transistors T3,j and T4,j each have a vertical channel ZCV and a buried vertical common selection gate CSG3,4. It should be noted that for the purpose of simplifying the figure, the contact allowing to connect the buried common gate CSG3,4 to the corresponding word line WL3,4, is not shown.

FIG. 7 illustrates more specifically the four cells M2,j, M3,j, M4,j, M5,j belonging to the same column j and to the 4 rows 2 to 5.

The drain of the transistors T2,j and T3,j is connected to the bit line BL2j and the drain of the transistors T4,j and T5,j is connected to the bit line BL1j which are the two bit lines for the column j.

Each memory cell has a first state, for example an erased state, wherein it stores a bit having a first logic value, for example the logic value 1, and a second state, for example a programmed state, wherein it stores a bit having a second logic value, for example the logic value 0.

The state transistor of a memory cell is advantageously configured to be on when the memory cell is in its first state and to be off when the memory cell is in its second state.

A simple way to obtain such a state transistor is to provide, for example, a state transistor of the depletion type as described in the aforementioned French patent application published under the no 3049380.

As is well known to the person skilled in the art, the depletion MOS transistor is on without a control voltage applied to the control gate of the state transistor (control gate connected to ground), and consequently to the floating gate by capacitive coupling. The state transistor is therefore said to be "normally on". On the other hand, the transistor becomes less and less conductive as the control voltage present on the control gate increases in absolute value (becomes more and more negative) to finally be blocked beyond a blocking voltage.

The channel ZCH of the state transistor is advantageously a surface channel so that it may be possible to be able to block conduction of the channel by applying an acceptable control voltage to the control gate of the state transistor.

The dopant implantation energy defines the depth of the channel ZCH. As an indication, this energy can be comprised between 5 keV and 100 keV leading then to a channel depth of the order of 100 nm.

In the case of a channel of N conductivity type, the dopants implanted can, for example, be arsenic As, and the concentration of dopants determines the threshold voltage Vtho of the state transistor of a memory cell at the virgin state. The state transistor is here configured to have such a negative threshold voltage Vtho. In this respect, it is possible to use a dose of implanted dopants comprised between 1012 atoms/cm2 and 1014 atoms/cm3.

With such a dose of dopants, it is possible to obtain a negative voltage Vtho comprised for example between −1 volt and −0.5 volt.

Figure 7A:
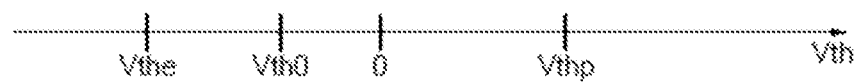
FIG. 7A illustrates different transistor threshold voltages.

In FIG. 7A, the different threshold voltages Vthe, Vtho and Vthp were schematically shown, corresponding respectively for example to erased, blank and programmed memory cells.

In read mode, a zero read voltage can be applied to the control gate CG of the state transistor and a positive voltage can be applied to the bit line BL.

The state transistor being a depletion transistor with a negative voltage Vtho, it is normally on for a blank memory cell, that is to say when no charge is present in the floating gate.

It then emerges from FIG. 7A that a state transistor of an erased memory cell will be on while the state transistor of a programmed memory cell will be off. And, the fact of applying a zero voltage to the control gate and consequently to the floating gate FG of the state transistor, does not induce read stress.

Moreover, the programming or the erasing of a floating-gate transistor is carried out here by the injection or the extraction of the electrical charges in the gate of the transistor by injection of hot electrons by way of high voltage(s).

More particularly, the erasing of a memory cell is ensured by combining a positive voltage applied to the substrate with a negative voltage applied to the control gate of its floating-gate state transistor.

This being the case, the memory plane SMA is advantageously erasable by block of memory cells.

A memory cell can be programmed, for example, by applying a positive voltage to the concerned bit line, by applying a zero voltage to the substrate, and a positive voltage to the control gate of its floating-gate state transistor.

The selection of such a memory cell to be programmed is carried out by applying a positive voltage higher than the threshold voltage of the state transistor, on the concerned word line.

Finally, as indicated above, the reading of a memory cell is ensured by applying a zero voltage to the control gate CG of its state transistor, as well as a positive voltage to the corresponding bit line.

The selection of such a memory cell to be read is carried out by applying a positive voltage higher than the threshold voltage of the state transistor, on the concerned word line.

In practice, in read mode, a zero voltage will be applied to the control gates of all the cells of the memory plane.

Figure 8:
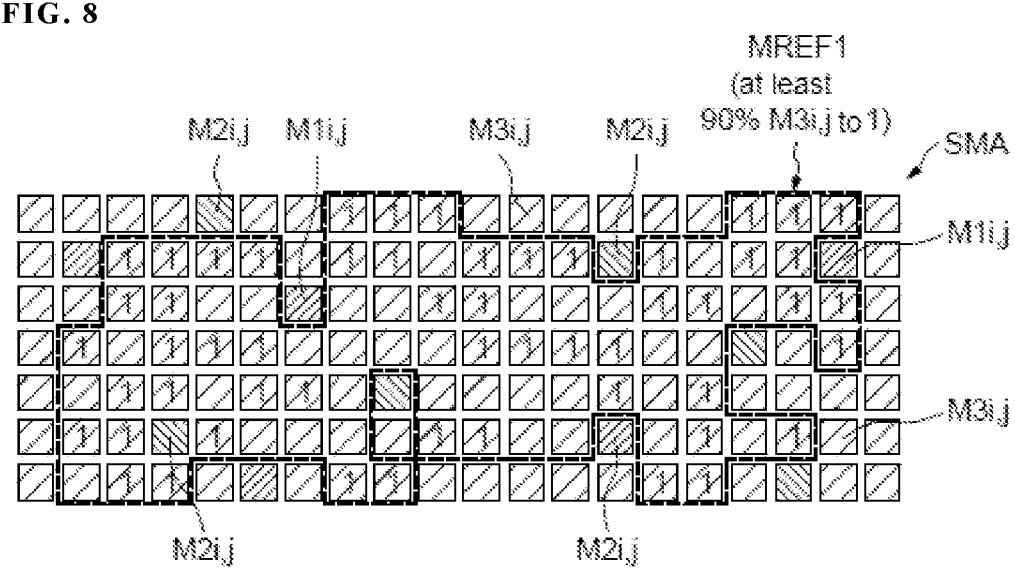
FIG. 8 illustrates first reference content intended to be stored in the memory plane.

FIG. 8 very schematically illustrates a first reference content MREF1 capable of being memorized in the memory plane SMA.

In this example, the first reference content MREF1 is characterized by at least 90% of the memory cells M3$i,j$ of the third memory area ZM3 in the erased state, that is to say storing a logic "1", regardless of the content of the remaining 10% of cells M3$i,j$ and regardless of the content or the state of the cells M1$i,j$ and M2$i,j$.

This first reference content MREF1 is representative of the unlocked status of the integrated circuit IC.

It should also be noted that in the unlocked status, the first memory cells M1$i,j$ do not contain the bits of the sensitive datum DTS.

Figure 9:
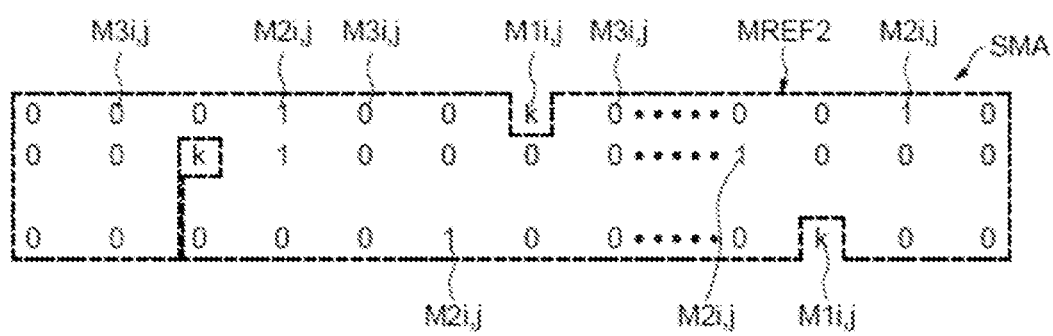
FIG. 9 illustrates second reference content intended to be stored in the memory plane.

FIG. 9 illustrates, again very schematically, a second reference content MREF2 intended to be stored in the memory plane SMA.

This second reference content is this time representative of the locked status of the integrated circuit.

Here, the second reference content includes all the memory cells M3$i,j$ of the third memory area in the programmed state, that is to say containing a logic "0", and all the memory cells M2$i,j$ in the erased state, that is to say containing a logic "1".

In the locked status of the integrated circuit IC, the first memory cells M1$i,j$ store the bits k of the sensitive datum DTS.

Even if all the bits of the datum DTS are designated here by the arbitrary value k, they are of course not all equal to the same logic value.

As will be seen below, the control block is advantageously configured to emit an anomaly signal, leading for example to the blocking of the integrated circuit, if the detected content of the memory plane is different from the first reference content MREF1 or from the second reference content.

However, it is only when the integrated circuit is in its unlocked status that it is possible to write to the memory plane SMA.

As will be seen below, the first reference content MREF1 is particularly advantageous because it is formed by part of the content of the memory plane SMA at the end of the manufacture of the integrated circuit.

Writing can therefore already be performed in the memory plane without performing any particular operations.

Therefore, if at this stage if it is not desired to perform a test of the memory plane, it is possible to directly write the locking content MREF2 in the memory plane as well as the sensitive datum DTS, so as to lock it and authorize the delivery of the sensitive datum outside the memory device DM.

If, on the other hand, it is desired, prior to placing the integrated circuit in its locked status, to carry out tests of the memory plane SMA with test content, these test content must also be representative of the unlocked status of the integrated circuit.

In other words, from this perspective, each of the first reference pattern and of the test content(s) will be considered as being a content called particular content corresponding to the unlocked status of the integrated circuit.

Figure 9A:
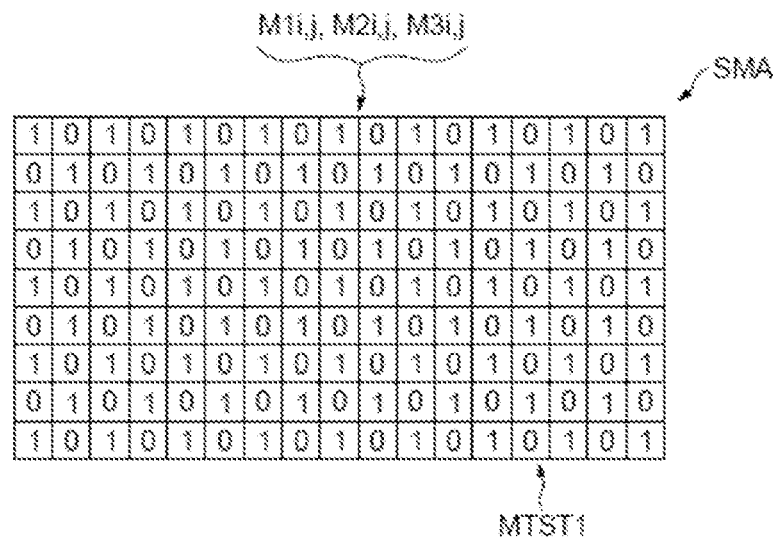
FIG. 9A illustrates a first test content for the memory plane.

As an example, a first interesting test content MTST1 is shown in FIG. 9A. In this first test content MTST1, all the memory cells of the memory plane SMA include either a logic "0" or a logic "1" so as to form a checkerboard.

Figure 9B:
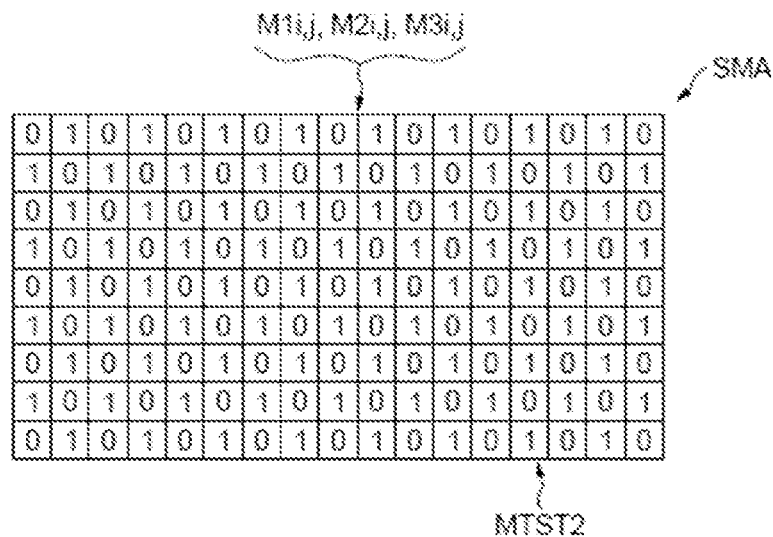
FIG. 9B illustrates a second test content for the memory plane.

A second possible test content is the content MTST2 illustrated in FIG. 9B, which is an inverted checkerboard from the checkerboard in FIG. 9A.

Figure 10:
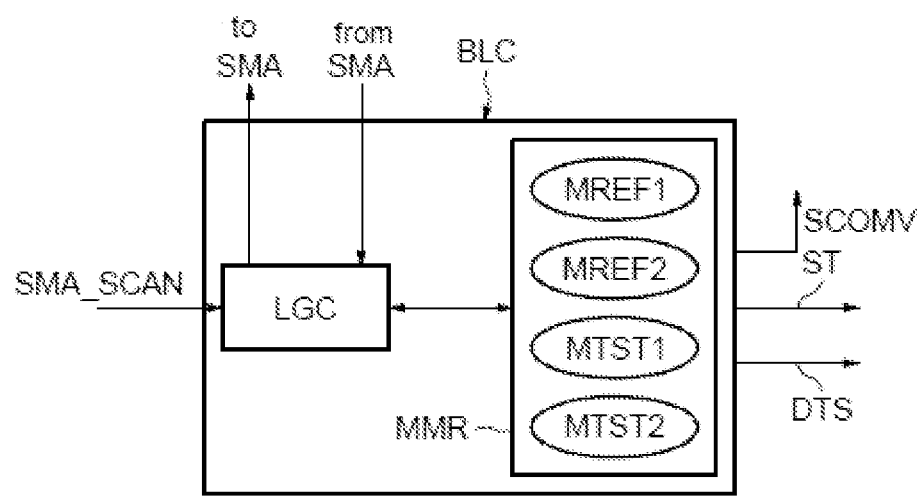
FIG. 10 illustrates an embodiment of the control block.

Reference is now made more particularly to FIG. 10 to describe an embodiment of the control block BLC.

The latter includes a memory MMR, for example a memory of the ROM type, containing the first reference content MREF1 and the second reference content MREF2.

This memory can also contain one or more test contents, here the two test contents MTST1 and MTST2 because, as indicated above, when the integrated circuit IC is in an unlocked status, it is quite possible to perform memory plane tests.

The control block BLC also includes a control logic LGC including for example a state machine associated with a reading block for the memory plane SMA, including in particular read amplifiers.

When the control logic LGC receives the scan control signal SMA_SCAN, it scans all the column addresses of the memory plane to successively read the bits of the different rows stored in the memory plane SMA.

Then, the control logic LGC can compare the memorized content thus read with the content stored in the memory MMR, here the first reference content MREF1, the second reference content MREF2 and the two test contents MTST1 and MTST2.

If the first reference content MREF1 is detected, then the status signal ST takes on a logic value representative of the unlocked status and the memory plane SMA can be tested with the test patterns MTST1 and MTST2 for example.

In this respect, the control logic can incorporate a structure known by the person skilled in the art under the name "Built-In Self-Test" (BIST) which allows the memory device to diagnose itself. More specifically, for example, the test content MTST1 is input to the memory device via the interface IF1. And, if the content memorized in the memory plane following this write control actually corresponds to the test content MTST1, the control logic can deliver a logic signal indicating that the test result is positive (OK).

As indicated above, when the second reference content MREF2 is detected, the status signal takes on a logic value corresponding to the locked status of the integrated status, the locking control signal SCOMV is delivered to the locking block locking the access in write mode of the memory plane and the bits of the datum DTS are delivered at the output of the memory device by the control block BLC.

Figure 11:
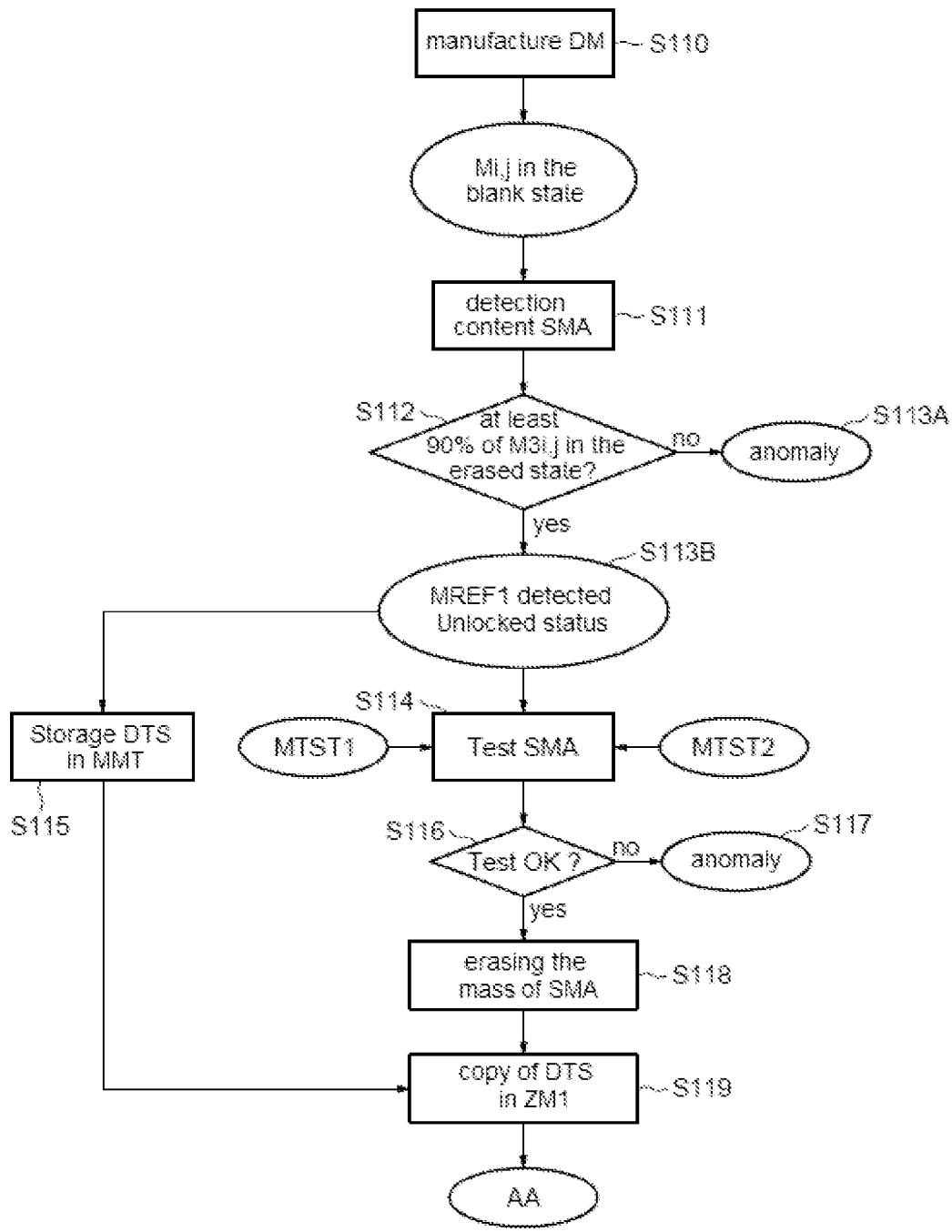
FIGS. 11 and 12 illustrate an embodiment method for testing and locking a memory device.
Figure 12:
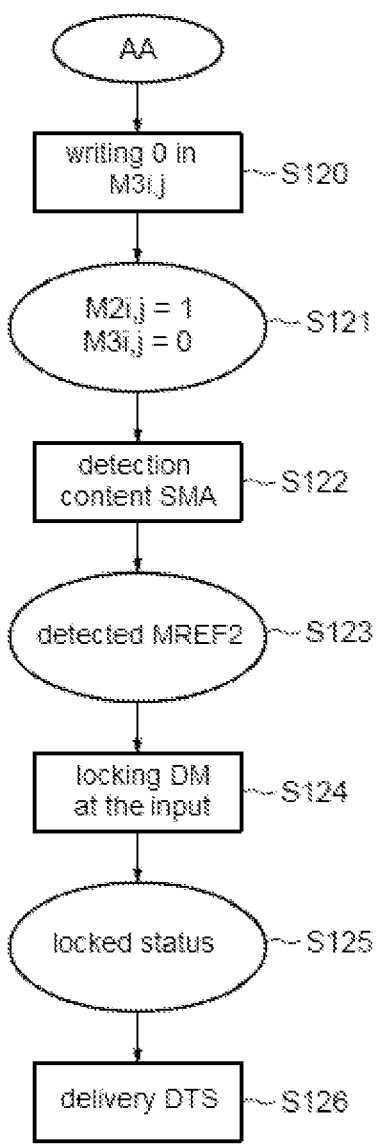

Reference is now made more particularly to FIG. 11 and subsequent to describe an embodiment of a method according to the invention.

In step S110, the memory device and the integrated circuit are manufactured in a conventional manner known per se.

At the end of this manufacture, all the memory cells M$i,j$, whether cells M1, M2 or M3, are in a virgin state, that is to say they have never been erased or programmed.

Also, in general, the majority of the memory cells in the virgin state have an erased state but, some of them can nevertheless have a programmed state.

This is the reason why during the detection of the content of the memory plane SMA in step S111, it is sought to detect whether at least 90% of the memory cells M3$i,j$ of the third memory area are at the erased state (step S112).

If not, then there is an anomaly (step S113A) and the method stops.

If on the other hand, in step S112, at least 90% of memory cells M3$i,j$ have been detected in the erased state, then the control logic LGC considers that the particular content, in this case the first reference content MREF1, has indeed been detected, which places the integrated circuit IC in its unlocked status (step S113B).

It is then possible to write data in the memory plane in order to perform in particular a test of the memory plane SMA (step S114) using one or more test contents, for example the content MTST1 and MTST2.

If the checkerboard of the first test content MTST1 is used first, then it is desired to perform another test with the reversed checkerboard of the second test content MTST2, it is possible to write the second test content in the memory plane, because the latter is still in its unlocked status (the first test content is indeed a particular content representative of the unlocked status). For this purpose, the programmed cells can be erased and the erased cells of the first test content MTST1 can be programmed.

Another possibility consists, since it is only possible to write in the memory plane when the unlocked status is detected, after each test, to erase at least 90% of the memory cells M3$i,j$ and in practice all the memory cells of the memory plane SMA, to find the first reference content MREF1 and again return to the unlocked status before performing a new test with a new test content, by writing for example the second test content MTST2.

Moreover, when the integrated circuit is in its unlocked status, the sensitive datum DTS is not stored in the memory plane SMA but in the temporary memory MMT (step S115).

If in step S116, the test of the memory plane SMA has proved to be incorrect, then there is again an anomaly detected (step S117) and there again the method stops.

If, on the other hand, the test turns out to be positive (OK) then, to write the second reference content MREF2 in the memory plane SM1, first in step S118 a mass erasure of the memory plane SMA is carried out which therefore places all the memory cells of this memory plane in the erased state (logic value "1" stored).

Then, the sensitive datum DTS is copied into the first memory area ZM1 (step 119).

Then, in step S120, all the cells M3$i,j$ of the third memory area are programmed, that is to say a 0 is written in these cells.

Since the memory cells M2$i,j$ which have been erased beforehand during the mass erasure have not been programmed, they retain their logic value 1.

Step S121 is restored, with a memory plane whose memory cells M2$i,j$ are in the erased state (they store bits of logic value 1), and the memory cells M3$i,j$ at the programmed state (they store bits with a logic value of 0).

The control logic LGC then detects in step S122 the content of the memory plane SMA and consequently, in step S123, the second reference content MREF2 is detected.

This has the consequence, as indicated above, of locking the memory device at the input.

This operation is irreversible, and no more writing can take place in the memory plane of the memory device (step 124).

The integrated circuit then has its locked status (step S125).

The delivery of the sensitive datum DTS is then possible and it is carried out by the control logic which extracts the bits from this sensitive datum and delivers them outside the memory device (step S126).

The integrated circuit can at this stage be delivered to the end user to be used.

Figure 13:
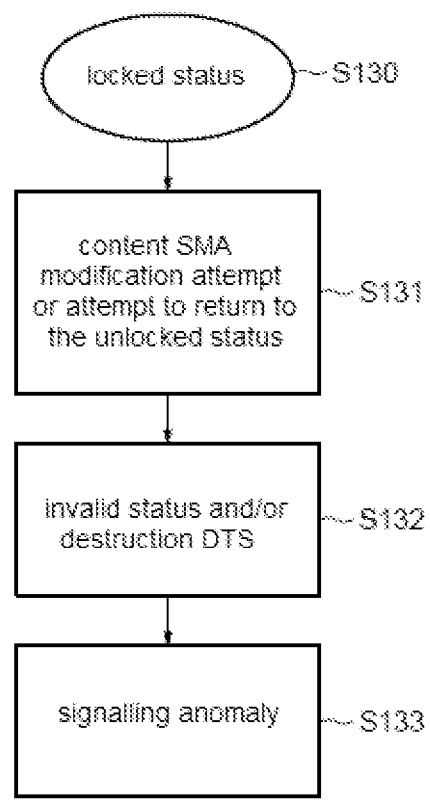
FIG. 13 illustrates an embodiment method for detecting and responding to fraudulent behavior regarding the sensitive datum.

Reference is now made more particularly to FIG. 13 to describe the consequences on the sensitive datum DTS, resulting from fraudulent behavior.

More specifically, when the integrated circuit is in its locked status (step 130), any attempt to modify the content of the memory plane SMA or any attempt to return to the unlocked status (step S131) leads to the delivery of an invalid status and/or the at least partial destruction of the sensitive datum DTS (step 132).

More specifically, if a malicious third party performs a mass erasure of the memory plane SMA, in an attempt to regain the unlocked status, in fact it changes to the value 1, the bits of the sensitive datum which had the value 0.

The datum DTS is therefore corrupted (at least partially destroyed) which makes the functional domain DMF of the integrated circuit non-operational (non-functional).

If the malicious third party wishes to carry out, as indicated above, selective erasing of memory cells by attempting to mask other adjacent memory cells that he does not wish to erase, these masked adjacent memory cells still have every chance to be erased by diffraction of ultraviolet radiation used for selective erasing. Thus, for example, this will corrupt the memory cells containing the bits of the sensitive datum, which are located immediately in the vicinity of the cells M3$i,j$ that the malicious third party wishes to erase in order to reprogram.

Likewise, it will be extremely difficult, if not impossible, for a malicious third party to carry out an attack of the FIB type to try to selectively program certain erased memory cells while not programming adjacent memory cells.

And, if the control logic detects a memorized content of the memory plane SMA which is different from the first reference content or from the second reference content, the status is then declared invalid and an anomaly is signaled (step S133).

In response to this anomaly signal, no datum is output from the memory device and the integrated circuit can also perform other protective actions, such as for example a complete blocking of the microcontroller.

Figure 14:
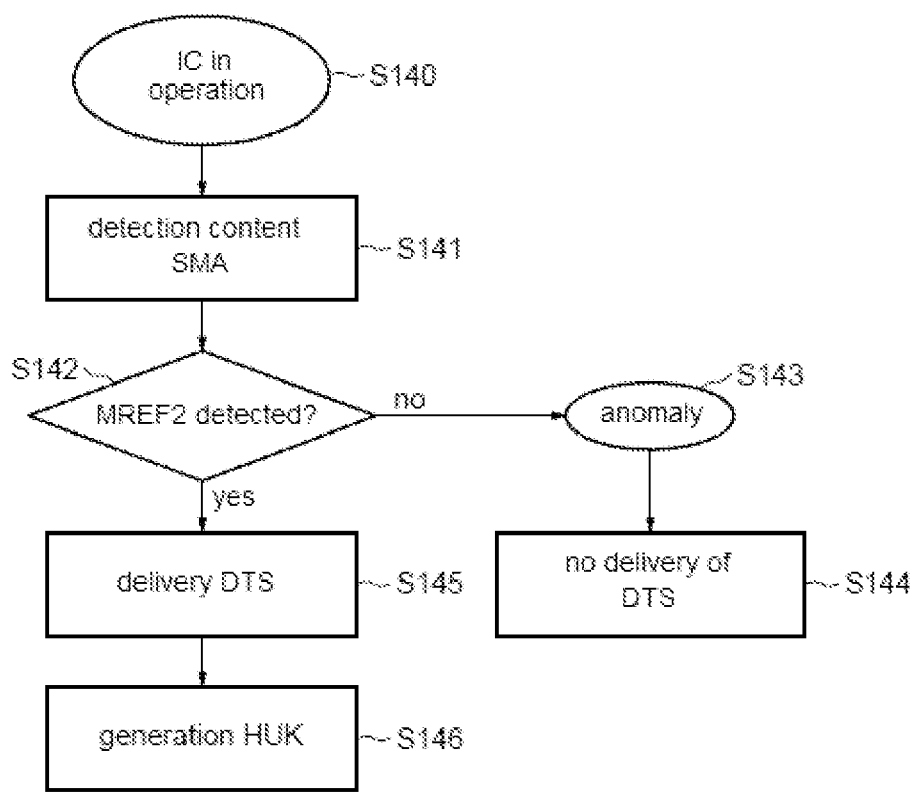
FIG. 14 illustrates use of the memory device when the integrated circuit is in operation.

FIG. 14 schematically illustrates a use of the memory device at the end user when the integrated circuit IC is in operation (step S140).

Before any operation intended to use the sensitive datum DTS, by the appropriate function of the integrated circuit, for example the encryption/decryption MCR, the control logic LGC performs a detection S141 of the content of the memory plane SMA.

If the second reference content MREF2 is detected in step S142, then the locked status is confirmed and the delivery of the output DTS in step S145 by the control logic LGC is possible and the encryption/decryption key HUK can be generated in step S146.

If, on the other hand, in step S142, the second reference content MREF is not detected, then there is detection of an anomaly and again blocking of the memory device and non-delivery of the sensitive datum DTS (step 144).

What is claimed is:

1. An integrated circuit, comprising:
   a memory device including:
   a memory plane having non-volatile memory cells and being non-observable in read mode from outside the memory device;
   a controller, internal to the memory device, configured to:
   detect a memorized content of the memory plane;
   lock any access to the memory plane from outside the memory device, in response to the memorized content containing a locking content, the integrated circuit then being in a locked status; and
   authorize delivery outside the memory device of at least one sensitive datum stored in the memory plane.

2. The integrated circuit according to claim 1, wherein the memory device comprises:
   an interface configured to receive data to be written in the memory plane; and
   an access block configured to memorize in the memory plane via the interface, in response to the memory plane containing a particular content corresponding to an unlocked status of the integrated circuit, the locking content corresponding to the locked status of the integrated circuit and the at least one sensitive datum;
   wherein the controller is configured to prohibit any access to the memory plane via the interface and authorize delivery of the at least one sensitive datum outside the memory device, in response to the memorized content containing the locking content.

3. The integrated circuit according to claim 1, comprising at least one functional domain, the at least one sensitive datum contributing to ensuring a functionality of the functional domain.

4. The integrated circuit according to claim 2, wherein respective mappings of the particular content and of the locking content, a location of the at least one sensitive datum in the memory plane as well as structural features of the memory plane are such that, when the integrated circuit is in its locked status, an attempt to modify the content memorized in the memory plane places the circuit in an invalid status prohibiting the delivery of the at least one sensitive datum outside the memory device and/or destroying at least a part of the memorized at least one sensitive datum.

5. The integrated circuit according to claim 2, wherein the controller is configured to detect the content memorized in the memory plane and signal an anomaly in response to the memorized content being different from the particular content or from the locking content.

6. The integrated circuit according to claim 2, wherein the particular content includes a first reference content being at least part of the content of the memory plane obtained at an end of a manufacture of the integrated circuit.

7. The integrated circuit according to claim 6, wherein the particular content belongs to a group formed by the first reference content and by at least one first test content intended to be used to test the memory plane before memorizing the locking content.

8. The circuit according to claim 2, wherein the controller includes a locking block configured, in a presence of a control signal, to lock access to write memory, and a control block configured to detect the content memorized in the memory plane, and when the locking content is detected, to deliver the control signal to the locking block and authorize the delivery of the at least one sensitive datum outside the memory.

9. The circuit according to claim 8, wherein the controller is configured to detect the content memorized in the memory plane and signal an anomaly in response to the memorized content being different from the particular content or from the locking content; and
   wherein the control block is configured to signal the anomaly if the memorized content is different from the particular content or from the locking content.

10. The circuit according to claim 1, wherein the memory plane is erasable by block of memory cells.

11. The integrated circuit according to claim 1, wherein a surface size of each memory cell is less than a limit size.

12. The integrated circuit according to claim 2,
    wherein each memory cell is configured to have a first state corresponding to a first logic value of a bit stored in the memory cell, and a second state corresponding to a second logic value of the bit stored in the memory cell;
    wherein the at least one sensitive datum includes at least one bit and the memory plane includes a first area containing one or more first memory cells configured to respectively store the bit(s) of the at least one sensitive datum, a second area, and a third area; and
    wherein in the locked status, the first area contains the at least one sensitive datum, the memory cells of the second area are in the first state and the memory cells of the third area are in the second state, the logic values of the bits of the memory cells of the second area and of the third area forming the locking content.

13. The integrated circuit according to claim 12, wherein the first state corresponds to an erased state of the memory cell, the bit stored in the memory cell in the erased state having the logic value 1, and the second state corresponds to a programmed state of the memory cell, the bit stored in the memory cell in the programmed state having the logic value 0.

14. The integrated circuit according to claim 13,
    wherein the particular content includes a first reference content being at least part of the content of the memory plane obtained at an end of a manufacture of the integrated circuit; and
    wherein in the unlocked status, the at least one sensitive datum is not stored in the first area, and the third area includes a number, greater than a threshold, of memory cells of the third area being in the first state, the logic values of these memory cells in the first state forming the first reference content.

15. The integrated circuit according to claim 14, wherein the threshold is equal to 90% of the number of memory cells of the third area.

16. The integrated circuit according to claim 14, wherein a number of first memory cells is less than the number of memory cells of the third area and the first memory cells are dispersed within the memory plane.

17. The integrated circuit according to claim 16, wherein the number of first memory cells is less than 15% of a number of memory cells of the memory plane.

18. The integrated circuit according to claim 14, wherein a number of memory cells of the second area is lower than the number of memory cells of the third area and the memory cells of the second area are dispersed within the memory plane.

19. The integrated circuit according to claim 18, wherein the number of memory cells of the second area is less than 15% of a number of memory cells of the memory plane.

20. The integrated circuit according to claim 14,
    wherein the particular content belongs to a group formed by the first reference content and by at least one first test content intended to be used to test the memory plane before memorizing the locking content; and wherein the at least one first test content includes logic "0" and logic "1" together forming a checkerboard.

21. The integrated circuit according to claim 12, wherein, to memorize the locking content and the at least one sensitive datum in the memory plane, the access block is configured to place all the memory cells of the memory plane in the first state, then to store the at least one sensitive datum in the first memory cell(s), then to place all the memory cells of the third area in the second state.

22. The integrated circuit according to claim 21, further including a temporary memory configured to store the at least one sensitive datum when the integrated circuit is in its unlocked status, and the access block is configured to copy the at least one sensitive datum into the first memory cell(s) and to erase the temporary memory.

23. The integrated circuit according to claim 1, wherein the memory cells are memory cells each having a floating gate, a control gate and a selection transistor buried in a substrate.

24. The integrated circuit according to claim 1, wherein the integrated circuit is a microcontroller.

25. A method for protecting an integrated circuit, the method comprising:
(a) equipping the integrated circuit with a memory device including a memory plane having non-volatile memory cells and being non-observable in read mode from outside the memory device;
(b) causing the memory device itself to detect a memorized content of the memory plane; and
(c) in response to the memorized content containing locking content, having the memory device itself lock any access to the memory plane from outside the memory device, the integrated circuit then being in a locked status, and having the memory device itself authorize delivery outside the memory device of at least one sensitive datum stored in the memory plane.

26. The method according to claim 25, wherein the memory device includes an interface:
step (b) further comprises, in response to the memory plane contains a particular content corresponding to an unlocked status of the integrated circuit, memorizing in the memory plane via the interface, the locking content and the at least one sensitive datum; and
step (c) comprises having the memory device prohibit any access to the memory plane via the interface and having the memory device itself authorize the delivery of the at least one sensitive datum outside the memory device.

27. The method according to claim 25, wherein step (a) is carried out during a manufacture of the integrated circuit, and steps (b) and (c) are carried out after the manufacture of the integrated circuit and before delivery of the integrated circuit to a user.

28. The method according to claim 27, further comprising after delivery of the integrated circuit to the user, during an operation of the integrated circuit, before any operation carried out by the integrated circuit requiring at least one use of the at least one sensitive datum, a detection by the memory device of the memorized content of the memory plane, and in response to the memorized content contains the locking content, the delivery by the memory device of the at least one sensitive datum outside the memory device.

29. The method according to claim 25, wherein when the integrated circuit is in its locked status, an attempt to modify the content memorized in the memory plane, places the circuit in an invalid status prohibiting the delivery of the at least one sensitive datum outside the memory device and/or destroys at least a part of the memorized at least one sensitive datum.

30. The method according to claim 25, wherein the integrated circuit comprises at least one functional domain, the at least one sensitive datum contributing to ensuring a functionality of the functional domain.

31. The method according to claim 26, wherein the memory device signals an anomaly if the memorized content is different from the particular content or from the locking content.

32. The method according to claim 26, wherein the particular content includes a first reference content being at least part of the content of the memory plane obtained after a manufacture of the integrated circuit.

33. The method according to claim 32, wherein the particular content belongs to a group formed by the first reference content and by at least one first test content, and step (b) further comprises a memory plane test with the at least one first test content.

34. The method according to claim 26, wherein in the unlocked status, the at least one sensitive datum is stored in a separate temporary memory of the memory plane, and the memorization of the locking content comprises erasing all the memory cells of the memory plane, then storing the at least one sensitive datum in the memory plane and writing the locking content in the memory plane and erasing the separate temporary memory.

* * * * *

UNITED STATES PATENT AND TRADEMARK OFFICE
CERTIFICATE OF CORRECTION

| | | |
|---|---|---|
| PATENT NO. | : 12,205,650 B2 | Page 1 of 1 |
| APPLICATION NO. | : 18/173472 | |
| DATED | : January 21, 2025 | |
| INVENTOR(S) | : Francesco La Rosa and Marco Bildgen | |

It is certified that error appears in the above-identified patent and that said Letters Patent is hereby corrected as shown below:

In the Claims

In Colum 19, Line 42, Claim 26:
Change "plane contains a particular content corresponding to an"
To --plane containing a particular content corresponding to an--

In Column 20, Line 12, Claim 28:
Change "plane, and in response to the memorized content contains the"
To --plane, and in response to the memorized content containing the--

Signed and Sealed this
Fourth Day of March, 2025

Coke Morgan Stewart
*Acting Director of the United States Patent and Trademark Office*